Patented July 19, 1927.

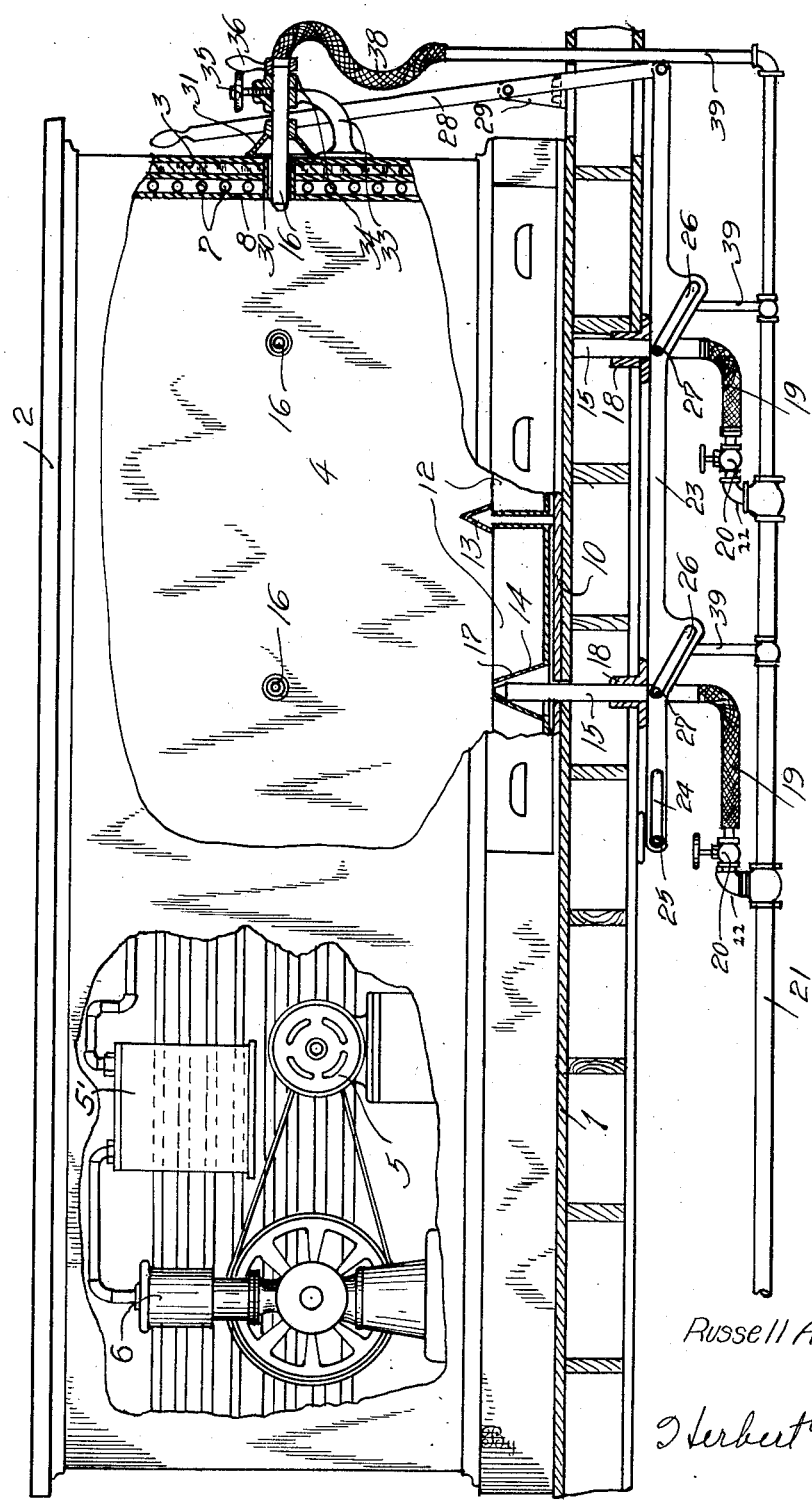

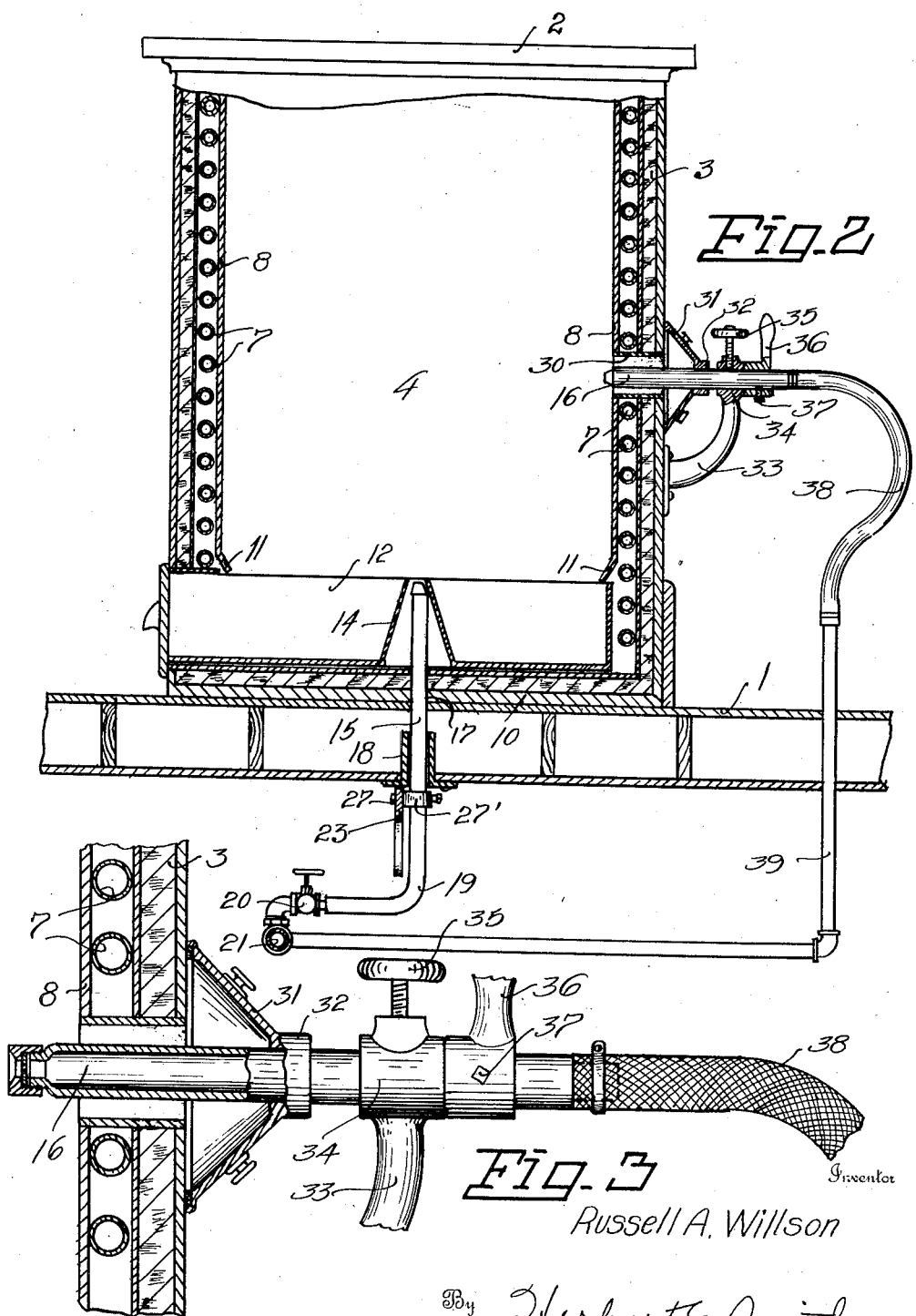

1,636,345

UNITED STATES PATENT OFFICE.

RUSSELL A. WILLSON, OF SPOKANE, WASHINGTON, ASSIGNOR OF ONE-HALF TO FRED N. MARTIN, OF SPOKANE, WASHINGTON; CARRIE WILLSON EXECUTRIX OF SAID RUSSELL A. WILLSON, DECEASED.

ICE-CREAM MACHINE.

Application filed April 2, 1925. Serial No. 20,308.

My present invention relates to improvements in ice cream machines of the type employing a freezing or congealing chamber into which atomized liquid is introduced, preferably under pressure, and the liquid atoms congealed, while in suspension within the chamber. The sprayed or atomized material while in suspension is congealed into formation similar to snow flakes and falls by gravity into waiting receptacles, after which it may be packed, or served, as in the form of ice cream, or a water ice, or other similar frozen food.

By the utilization of my invention I provide a product which is smooth to the taste, palatable, free from lumps, and which may readily and uniformly be flavored during the process of its production, and also colored as desired, by the introduction of flavoring and coloring agencies.

The invention contemplates the use of a compactly arranged refrigerating machine, coils for a liquid refrigerant, and a congealing chamber, whereby ice cream may be manufactured and sold or dispensed, as in a restaurant, the sales-counter being used as the enclosing structure for the refrigerating apparatus and congealing chamber. The invention consists in certain novel combinations and arrangements of parts involving the use of atomizing nozzles and congealing chamber as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view showing partly in longitudinal elevation and partly in section, a sales counter with which the apparatus of my invention is embodied.

Figure 2 is a transverse vertical sectional view of the apparatus of Figure 1 on an enlarged scale.

Figure 3 is an enlarged detail sectional view of one of the horizontal atomizing nozzles and its connections.

In the physical embodiment of my invention I have indicated a floor as 1 in Figures 1 and 2 which may be provided for a room or other place in which the ice cream is to be dispensed, as from the top 2 of the counter or cabinet structure which is fashioned with insulated walls 3 to form a congealing chamber 4. In the interior of the counter or cabinet a refrigerating apparatus for circulating a refrigerating medium or liquid refrigerant is provided which includes an electric motor 5 and pump or compressor 6 which supplies the circulation of the liquid refrigerant through the cooling coils 7 that surround the congealing chamber. The interior of the chamber is preferably provided with sanitary face plates 8, of suitable material, and these face plates or inner walls of the chamber terminate above the bottom 10 of the cabinet with inwardly curled or bent lower edges 11 to act as deflectors for the falling, congealed, flakes.

The congealed flakes fall into a series of gathering trays or removable drawers 12 located in the bottom of the chamber and slidable for insertion therein or removal therefrom. The removable drawers or trays are placed side by side and above the space between their adjoining walls is provided an angular deflector plate 13 which extends transversely of the chamber and is secured to its side walls, for the purpose of deflecting and guiding the falling flakes into the respective receptacles or trays. Each tray is fashioned with a cone shaped guard 14 open at top and bottom and fixed about an opening in the bottom of the tray, for the accommodation of a bottom or vertical atomizing nozzle 15. A suitable number of these nozzles is employed to direct a spray or shower of the liquid material to be congealed upwardly from the bottom of the chamber, and in addition to these nozzles 15 I employ a suitable number of horizontally disposed nozzles 16 adapted to atomize and spray the liquid material in a horizontal direction. By the use of the two sets of nozzles the liquid material to be congealed may be sprayed within the entire interior area of the chamber, and when different materials, as flavoring agents and coloring agents, are sprayed, in addition to the liquid material for the ice cream, it will be apparent that the two constituents or three constituents, or more if desired, may be uniformly and thoroughly commingled in flaky form, to either flavor or color the product, or both flavor and color the product. Means are provided whereby the spraying of the material forming the base of the ice cream and the spraying of the coloring and flavoring agents is controlled and may be regulated to produce various flavors and colors to the finished product.

For the accommodation of the removable vertical nozzles an opening 17 in the floor is provided and a guide sleeve 18 is also used for the nozzle, in each instance. The nozzles which normally project up into the conical guards 14 of the trays are removable downwardly for the purpose of permitting the removal of the trays when the ice cream is to be withdrawn from the congealing chamber, and to permit this downward or vertical movement of the nozzles they are provided with flexible branch pipes or hose 19 which are attached to a valve and coupling 20 which are connected to the main pipe 21 by joints 22. The liquid material to be congealed is supplied through the main pipe and its introduction through the various nozzles to the congealing chamber is controlled by the several valves 20. For simultaneously withdrawing the vertical nozzles from the trays I utilize an operating slide bar 23 located below the congealing chamber and parallel with the floor. This bar is supported at its slotted end 24 on a bracket or supporting pin 25 and the slide bar is capable of longitudinal movement to actuate the nozzles. For each nozzle an inclined or obliquely disposed slot 26 is fashioned in the slide bar and each slot coacts with an actuating pin 27 projecting laterally from a collar 27' fixed in adjusted position on the nozzle below the guide sleeve 18. An operating lever 28 which is pivoted in a bracket 29 extends upwardly near one end of the cabinet, and at its lower end is pivoted to the slide bar. It will be apparent that by pulling the lever to the right in Figure 1 the slide bar will be shoved to the left and the cam action of the walls of the oblique slots 26 in combination with the pins 27 will withdraw the nozzles from the trays, after which the loaded trays may be withdrawn from the congealing chamber and emptied, and then returned to the chamber. After replacing the trays the nozzles are returned to normal position within the conical guards of the trays by actuating the lever.

In connection with the side or horizontal nozzles 16 I employ vent openings or ports in which a sleeve 30 is fixed, these openings being adapted to admit air or gas to the interior of the congealing chamber when required. In some instances in the preparation of a confection within the congealing chamber it is desirable to introduce carbonic gas thereto, and this may be done in suitable manner.

For regulating the passage of air through this vent opening I provide an adjustable conical shaped closure 31 having a hub sleeve 32 on the nozzle. The closure may be adjusted by sliding the hub on the nozzle to uncover or partially uncover the vent opening for ingress or egress of air to or from the chamber within the cabinet.

The horizontal nozzle is adjustably supported in a bracket 33 having a sleeve 34, and by means of the set bolt 35 the nozzle may be retained in adjusted position in the sleeve. A handle 36 is provided near the outer end of the nozzle for manipulating the latter and a set screw 37 retains the handle in set position. Each horizontal nozzle is provided with a flexible pipe or hose 38 and the flexible pipe is connected with the branch pipe 39 from the main pipe 21, or one or more of the nozzles may be connected to other supply pipes for the purpose of supplying different flavors or different coloring agencies to the interior of the congealing chamber.

Preferably the liquid material is atomized through the nozzles by means of a motive fluid, such as air under pressure which may be supplied through the main pipe and its branches or through other suitable pipes. The liquid material as it is atomized is sprayed to all parts of the congealing chamber and while in suspension the sprayed material is congealed and falls in flakes to the trays prepared for the purpose. The walls or plates 8 may be of metal and are provided with enamelled surfaces to which the flakes will not adhere and as a result all of the flakes fall like snow into the trays.

Having thus fully described my invention what I claim as new and desire to secure by Letters Patent is—

1. In an ice cream apparatus the combination with a congealing chamber having an opening in its wall and refrigerating means for said chamber, of means for varying the venting capacity of said opening, an exterior spraying device having its nozzle in said opening, and means for adjusting said nozzle with relation to the interior of the chamber and with relation to said second named means.

2. In an ice cream apparatus the combination with a congealing chamber, refrigerating means in said chamber and a removable tray in said chamber, of a nozzle adapted to direct an atomized spray through said tray, and means for withdrawing said nozzle to permit the removal of a loaded tray.

3. In an ice cream apparatus the combination of a congealing chamber and refrigerating means in said chamber and a removable tray in said chamber, said tray having an opening therein and a shield, an atomizing nozzle normally located in said shield, and means for withdrawing said nozzle to permit removal of a loaded tray.

4. In an ice cream apparatus having a congealing chamber and refrigerating means in said chamber, the combination with a receptacle located in said chamber and having a shielded opening in its bottom, of a nozzle in said opening, a supply pipe and a flexible connection between said pipe and nozzle, and means for withdrawing said nozzle from the receptacle to permit removal of the latter.

5. In an ice cream apparatus the combination with a congealing chamber, refrigerating means in said chamber, and a removable tray in said chamber, said tray having an opening therein and a shield for said opening, of a movable nozzle normally located in said opening, a supply pipe and a flexible connection between said pipe and nozzle, a slotted slide bar and co-acting means operative therewith on the nozzle for moving the latter, and means for reciprocating said slotted slide bar.

In testimony whereof I affix my signature.

RUSSELL A. WILLSON.